United States Patent [15] 3,636,324
Dommasch [45] Jan. 18, 1972

[54] AIR DATA LATERAL-DIRECTIONAL STABILITY AUGMENTATION SYSTEM

[72] Inventor: Daniel O. Dommasch, Blawenburg, N.J.

[73] Assignee: The United States of America as represented by the Administrator of the Federal Aviation Administration

[22] Filed: Jan. 28, 1970

[21] Appl. No.: 6,636

[52] U.S. Cl. ....................235/150.2, 114/23, 244/3.15, 244/77 R, 318/580, 318/586, 318/589, 318/637

[51] Int. Cl. ....................G06g 7/78

[58] Field of Search....................244/3.15, 77 R; 235/150.2; 73/180; 114/23; 180/118; 318/580, 586, 589, 637, 645

[56] References Cited

UNITED STATES PATENTS 2,761,315 9/1956 Anderson et al....................73/108
3,031,998 5/1962 Wurmser....................114/23
3,404,856 10/1968 Gerstine....................318/580 X

*Primary Examiner*—Malcolm A. Morrison
*Assistant Examiner*—R. Stephen Dildine, Jr.
*Attorney*—Charles K. Wright, Jr., William G. Gapcynski and Lawrence A. Neureither

[57] ABSTRACT

A system designed to augment lateral-directional stability of aircraft without the use of conventional gyroscopic sensing elements. A logic control system is used to interpret the dynamic pressure signals sensed near each wingtip, and the output of this logic can be used to provide actuation by pneumatic, electrical, or hydraulic actuations. Operation of both ailerons and rudder is normally involved, although aileron only control is possible in aircraft having inherently high directional damping.

6 Claims, 1 Drawing Figure

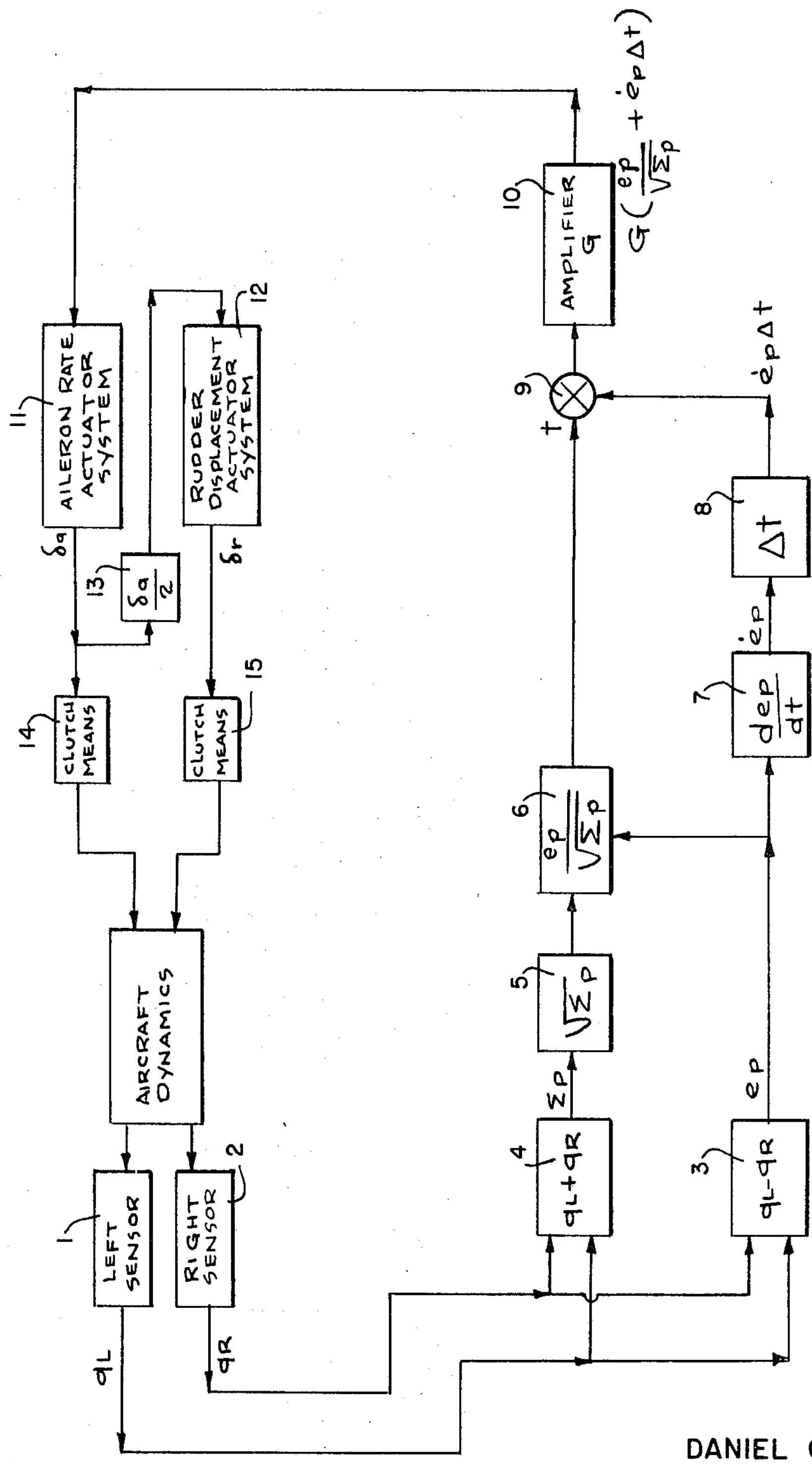
INVENTOR
DANIEL O. DOMMASCH
BY Charles K Wright Jr
ATTORNEY

AIR DATA LATERAL-DIRECTIONAL STABILITY AUGMENTATION SYSTEM

BACKGROUND OF THE INVENTION

1. Field of the Invention

This invention is a lateral-directional stability augmentation system for aircraft which uses sensed air data rather than gyroscopic or inertial sensors to provide the basis for control of the ailerons and rudder.

2. Description of the Prior Art

Earlier systems performing similar functions have been built using both rate and position gyroscopes, and attempts have been made to use raw air data to provide aileron control for "wings level" operation. These earlier air data concepts have not proven successful because of improper control law logic and because they lacked sufficient authority to overcome variable friction in the control systems. Moreover, unless rudder control as well as aileron control is simultaneously used, roll stabilization based only on aileron operation will lead to unstable Dutch Roll oscillations in the slow flight region of operation. This requires that the system be turned off below a given speed and altitude to ensure safe operation of the aircraft.

The use of gyroscopic sensors on flexible aircraft poses major problems in that the gyroscope sense the structural deformation modes, and unless steps are taken to prevent feedback of this information, coupling between the control logic and structural binding modes results.

SUMMARY OF THE INVENTION

This invention provides lateral-directional stabilization for an aircraft through the use of dynamic pressure sensors mounted near each wingtip, a control logic system, and an actuating system connected to the aircraft control surfaces through clutch means so that the system may be manually overridden. Both the ailerons and the rudder are controlled, thus preventing any tendency toward oscillation in the slow flight region. The use of air data sensors, rather than gyroscopes, also eliminates the undesirable coupling of the control system with he structural bending modes of the aircraft.

Therefore, it is an object of this invention to provide a lateral-directional stabilization system for aircraft that is stable over all phases of flight operation and that does not couple with structural bending modes of the aircraft.

It is a further object of this invention to provide a lateral-directional stabilization system for aircraft that is simple and inexpensive so that it is applicable to general aviation aircraft.

It is also an object of this invention to provide a lateral-directional stabilization system for aircraft which is capable of being manually overridden at anytime.

BRIEF DESCRIPTION OF THE DRAWINGS

The FIGURE is a functional block diagram of the invention.

DESCRIPTION OF THE PREFERRED EMBODIMENT

Referring to the FIGURE, there is shown a functional block diagram of the lateral-directional stabilization system. The stabilization system is comprised of three basic subgroups: the sensor elements, the control logic, and the actuator system. The sensor elements 1, 2 are each pitot-static sensors mounted near the wingtips of the aircraft. These sensors measure the dynamic pressure at the wingtips and provide an electrical signal indicative of the magnitude of the sensed qualities. The sensors should be heated to prevent icing. The outputs from the right and left wingtips are designated $q_R$ and $q_L$ respectively, and the sign of their difference, $q_L - q_R$, is indicative of the direction of turn of the aircraft.

The logic system provides an output displacement command to the actuator system in response to signals from the sensor elements. A logic system which produces an actuation proportional to the error signal is said to use proportional logic. Proportional logic systems have the disadvantage of tending toward oscillatory instability at high gain values. They also induce overshoot at even moderate gains unless they are highly damped. Predictive or lead type logic, also known as error and error rate logic, features considerably improved high gain operation and total elimination of error at moderate gain. In this type of logic both the error and its rate of change are detected, and the probable error at some future time is predicted. This predicted error is then used as the basis for the control system.

The logic system generates an output command to the actuator system by solving the equation command $$\dot{\delta} = G\left[\frac{e_p}{\sqrt{\Sigma_p}} + \dot{e}_p \Delta t\right]$$

where $G$ is the system gain;

$e_p$ is the difference in dynamic pressures, $q_L - q_R$;

$\Sigma_p$ is the sum of the dynamic pressures, $q_L + q_R$;

$\Delta t$ is the predicted or lead time of the system; and $\dot{\delta}$ is the output command to the actuator system.

The dynamic pressure sensors 1, 2 provides signals $q_L$ and $q_R$ indicative of the dynamic pressures at the wingtips. These signals are connected to unit 3 which forms the difference, $e_p$, between $q_L$ and $q_R$ and to unit 4 which determines the sum, $\Sigma_p$, of $q_L$ and $q_R$. The output $\Sigma_p$ from 4 is connected to unit 5 which extracts the square root of $\Sigma_p$, $\sqrt{\Sigma_p}$. Unit 6 then operates on $\sqrt{\Sigma_p}$ and $e_p$ to form the ratio $e_p/\sqrt{\Sigma_p}$. The signal $e_p$ is differentiated by unit 7 and the predicted change at some future time, $\Delta t$, of the difference in dynamic pressure, $\dot{e}_p \Delta t$, is determined by unit 8. The predicted change in the dynamic pressure is added to the signal $e_p\sqrt{\Sigma_p}$ at node 9 to form the sum $e_p/\sqrt{\Sigma_p} + \dot{e}_p \Delta t$. This signal is then amplified by amplifier 10 to provide the output displacement command to the actuating system.

The actuating system is comprised of an aileron actuator 11 and a rudder actuator 12. Both the ailerons and the rudder are actuated to prevent instability in the slow flight region of the aircraft. The ailerons are actuated by the output displacement command, and it is essential that this output be implemented as a rate rather than as a total displacement command, since total displacement commands can lead to unstable behavior. The rudder is actuated proportionately to the displacement of the ailerons to counteract the effect of adverse aileron yaw. Fifty percent proportional rudder actuation has been found to insure favorable characteristics in this embodiment; therefore, by measuring the total aileron displacement with a potentiometer or a synchro unit, the displacement command to the rudder actuator system can be generated. Unit 13 provides an output command to the rudder actuator system 12 according to the following relationship with the aileron displacement:

$$\delta_r = \delta_a/2$$

where $\delta_r$ is the rudder displacement, and $\delta_a$ is the aileron displacement.

The actuator systems 11 and 12 are connected to their respective control surfaces through clutch means 14 and 15 so that the stabilization system can be manually overridden by the pilot. This parallel operation provides a unique safety feature as the pilot and the stabilization system are mutually redundant.

In normal operation any difference in the dynamic pressures sensed by sensors 1 and 2 will result in difference signal which will provide the basis of an output displacement command to the actuator systems 11 and 12. The resulting displacement of the control surfaces will tend to return the aircraft to a straight flight path. A heading bias signal $e_H$ from a VOR receiver could be applied to the control logic input to provide for autopilot heading control and tracking functions, if desired.

I claim:

1. In an aircraft equipped with aileron and rudder control surfaces, a lateral-directional stabilization system comprising a first dynamic air pressure sensor means which generates a first signal mounted near the right wingtip of said aircraft, a second dynamic air pressure sensor means which generates a second signal mounted near the left wingtip of said aircraft, means for combining said first and second signals to form an error signal, a logic system which produces an output displacement command being nonproportional to the error signal, actuating means responsive to said output displacement command to effect a displacement in said aileron and rudder control surfaces.

2. The system of claim 1 in which said actuating means comprises an aileron actuating system which actuates said aileron control surfaces at a rate responsive to said output displacement command and a rudder-actuating system which causes a displacement of said rudder control surface proportional to the displacement of said aileron control surfaces.

3. The system of claim 2 in which said rudder displacement is 50 percent of said aileron displacement.

4. The system of claim 1 in which said dynamic air pressure sensor elements are heated pitot-static sensors.

5. The system of claim 1 in which said actuator system is operatively converted to said aileron and rudder control surfaces through clutch means so that said stabilization system may be manually overridden.

6. In an aircraft equipped with aileron and rudder control surfaces, a lateral-directional stabilization system comprising a first heated pitot-static air pressure sensor means which generates a first signal mounted near the right wingtip of said aircraft, a second heated pitot-static air pressure sensor means which generates a second signal mounted near the left wingtip of said aircraft, a logic system comprising means to combine said first and second signals to form a signal representative of the difference between said first and second signals, means for combining said first and second signals to form a signal representative of the sum of said first and second signals, differentiating means responsive to said difference signal, means to form the product of said differentiated difference signal and incremental time to form a predicted pressure change signal, means for extracting the square root of said sum signal, combining means for forming a signal representative of the ratio of said difference signal to said square root of said sum signal, combining means for obtaining the sum of said ratio signal and said predicted pressure change signal to form a third signal, amplifying means operating on said third signal to form an output displacement command signal, actuating means responsive to said output displacement command signal, said actuating means comprising an aileron actuating signal which displaces said aileron control surfaces at a rate responsive to said output displacement command signal, and a rudder actuating system which causes a displacement of said rudder control surface proportional to the displacement of said aileron control surface, said actuating means operatively connected to said aileron and rudder control surfaces through clutch means so that said stabilization system may be manually overridden.

* * * * *